Dec. 15, 1964

W. E. THORNTON ETAL

3,161,877

RADAR SCORING SYSTEM

Filed May 5, 1961

INVENTORS:
William E. Thornton
Isaac R. Cherry
Clifford Sanctuary

By Smyth, Roston & Pavitt

Attorneys

Dec. 15, 1964 W. E. THORNTON ETAL 3,161,877
RADAR SCORING SYSTEM
Filed May 5, 1961
4 Sheets-Sheet 2

INVENTORS:
William E. Thornton
Isaac R. Cherry
Clifford Sanctuary

By Smyth, Roston & Pavitt
Attorneys

United States Patent Office

3,161,877
Patented Dec. 15, 1964

3,161,877
RADAR SCORING SYSTEM
William E. Thornton, Chapel Hill, N.C., and Isaac R. Cherry, Torrance, and Clifford Sanctuary, Rolling Hills Estates, Calif., assignors to Del Mar Engineering Laboratories, Los Angeles, Calif., a corporation of California
Filed May 5, 1961, Ser. No. 107,999
7 Claims. (Cl. 343—12)

This invention relates to a miss distance indicating system which provides instantaneous display of the miss distance for missiles or other relatively high speed moving objects. More particularly, this invention relates to an indicating system for providing a visual indication of the distance between a target and the nearest approach of another object, such as a missile, instantaneously after the other object has passed the target. The system is advantageous in that it does not require any components of the system to be carried by the object or missile. The invention also relates to methods of instantaneously determining miss distances between a missile and a target and indicating such miss distances not only by direct readout as from a meter but also by emitting various visual signals from the target.

Various systems have been devised for determining and providing an indication of the miss distance between a moving object and a target. Some prior systems have used electromagnetic waves; others have used optics; still others have used a combination of electromagnetics and optics; and others have used radioactive materials. Though these systems have been developed for limited use, none has heretofore provided satisfactory operation in a lightweight airborne target. For example, the systems previously devised have required that certain equipment be carried by the moving object such as the missile so that the systems have not been able to be self-contained within the target. This has been especially true of the systems using electromagnetic waves and the systems using radioactive materials.

Furthermore, no previous system has provided instantaneous display of the miss distance either by a direct readout in the target or by a visual signal, such as a smoke puff. A visual indication such as a smoke puff is desirable since it indicates to observers displaced from the target and the moving object that the missile has passed within a particular distance of the target. For example, systems using optics have required the processing and analysis of motion picture film to determine the miss distance so that instantaneous indications have not been able to be provided.

In an illustrative embodiment of this invention, a small lightweight target-borne distance indicating system is provided which instantaneously displays the miss distance by a direct readout in the target. Such a direct readout is advantageous since it can be instantaneously transmitted as by a telemetering system to a ground station which decodes the telemetered information and makes the decoded information instantaneously available to observers at the ground station. The miss distance is also instantaneously displayed as by a visual signal, such as a smoke puff, to indicate to observers at positions removed from the missile and the target that the missile has approached within a particular distance of a target.

The miss distance indicator system of the present invention is carried within the target and is so constituted that it can be used with any missile or object without modification or the addition of any components of the system to the missile or object. The system constituting this invention is especially advantageous when used with a stable rigid target which has no relative movement of reflecting surfaces. For example, the target may be a non-spinning target of the type disclosed in application Serial No. 471,234, filed November 26, 1954, by Robert J. Hopper.

The transmitter included in one embodiment of this invention is disposed in the target and is constructed to provide continuous wave signals at a fixed frequency. These signals are transmitted from the target to the moving object such as the missile and are reflected from the missile. The resultant signals at the target are amplitude modulated by the constructive and destructive interference which takes place between the transmitted signals and the signals reflected by the moving object such as the missile. The rate at which this interference takes place is the difference between the frequency of the transmitted signals and the apparent frequency of the signals reflected by the moving object (which is a function of the radial velocity of the moving object relative to the target). Such difference—or Doppler—frequency is maximum and constant at relatively large distances, decreases toward zero as the missile approaches the target and actually becomes zero as the missile moves past the target.

The system constituting this invention includes a computer as an integral part of the invention. The computer makes use of certain assumptions in determining the miss distance between the missile and the target. For example, the computer assumes that the path of the missile relative to the target is a straight line. The computer first determines the constant and maximum Doppler frequency at a position of the missile distant from the target, converts this frequency to a voltage proportionate to the frequency and stores the proportionate voltage. The computer then determines the instantaneous Doppler frequency on a continuous basis during the approach of the missile toward the target and converts this instantaneous Doppler frequency to a corresponding voltage.

The computer compares the instantaneous voltage and the stored voltage to control the operation of a gate. For example, the computer may produce a first control signal when the instantaneous voltage has a value corresponding to 70% of the stored voltage. This first control signal may be instrumental in opening the gate. The computer may subsequently produce a second control signal when the instantaneous voltage has a value corresponding to 40% of the stored voltage. This second control signal may be instrumental in closing the gate.

During the time that the gate is open, the stored voltage is integrated to obtain the product of the time interval and the constant and maximum Doppler frequency. This product represents the miss distance. The product is instantaneously determined by the computer and the resultant value can be instantaneously transmitted to a ground station as by telemetering equipment in the target. Since the computer makes its computations instantaneously, it completes the computation before the missile reaches the target. This prevents the results provided by the computer from being affected by any shock waves which may be produced at the target when the missile reaches the target.

The computer is associated with the visual indication equipment such as smoke signal apparatus of the type disclosed in copending patent application Serial No. 37,158, filed on June 20, 1960, in the names of M. W. Humphrey et al. as joint inventors, now patent No. 3,065,967. When the missile passes within a first particular distance from the target, one smoke puff may be produced. When the missile passes within a second particular distance from the target such as a distance greater than the first distance, two smoke puffs may be produced. Similarly, three smoke puffs may be produced when the missile passes within a third particular distance from the target greater than the first and second particular distances. These smoke puffs instantaneously indicate to a visual observer at a position removed from the missile and the target as to the relative distance at which the missile has approached the target.

Figure 1:
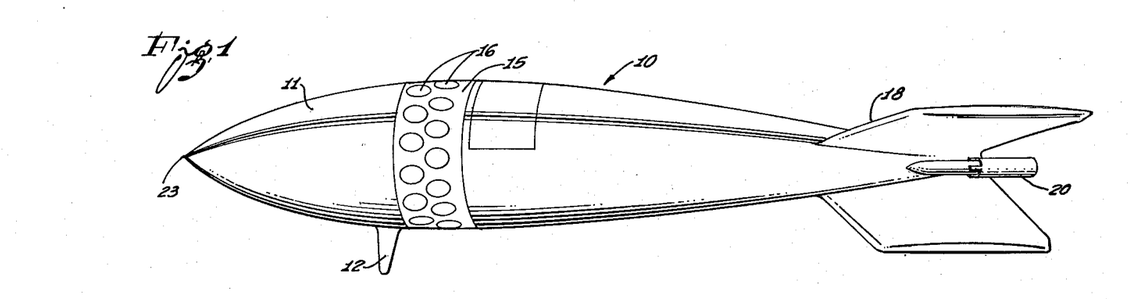
FIGURE 1 is a perspective view of a target preferably used in this invention to hold the system constituting this invention for determining the miss distance between a missile and the target.

FIGURE 1 illustrates a tow target 10 which includes the main components of the miss-distance indicator system of this invention. The target 10 is provided with an elongated streamlined shape and is towed by means of a tow line, not shown, which may be made of nylon. The tow target 10 may be affixed at a coupling 23 to the towline. The target 10 includes a nose portion 11 having the coupling 23 and an antenna 12 protruding from the ventral side of the target 10 and enclosed in an epoxy dome. As is hereinafter described, the antenna 12 is coupled to a transmitter 30 depicted in FIGURE 2 and enclosed in the nose portion 11 of the target 10.

Adjacent to the nose portion 11 is a cartridge drum assembly 15 having a number of smoke cartridges 16. The assembly 15 may be of the type described in the above-identified copending patent application filed by Michael W. Humphrey et al. When energized, the cartridges 16 provide smoke puffs for visual indicating purposes.

The tow target 10 is stabilized by a number of fins 18 at the tail of the target 10 so that the target 10 does not rotate as it is pulled through the air at the end of the towline. In addition to the cartridges 16 which provide visual indications, the tow target also includes at its tail a number of flares 20 which may be ignited for purposes of visual or infrared augmentation.

Figure 2:
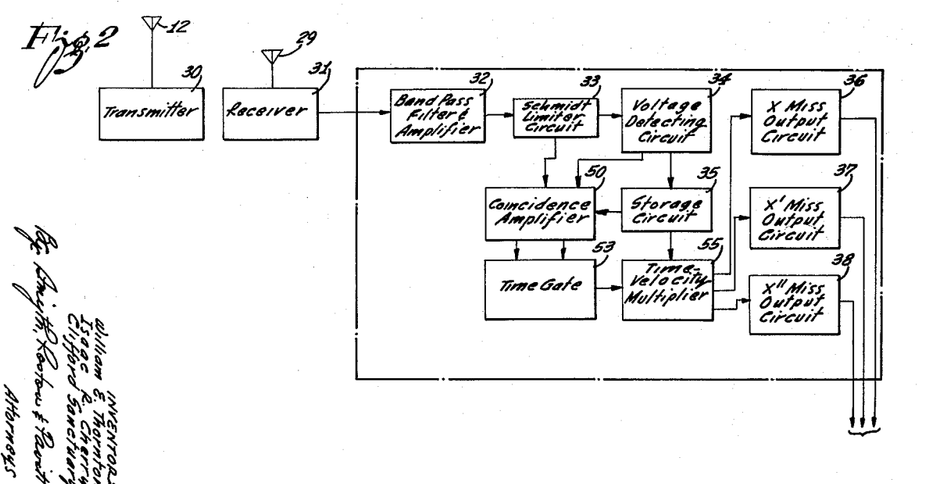
FIGURE 2 is a circuit diagram in block form of one embodiment of the system constituting this invention for determining the miss distance between the missile and the target.

Referring now to FIGURE 2, the nose portion 11 of the target 10 includes a transmitter 30 which is coupled to the antenna 12 shown in FIGURE 1. The nose portion 11 also includes a receiver 31 having its individually coupled antenna 29. The transmitter 30 may provide a single frequency signal at a suitable frequency such as 1970 megacycles. The signal is radiated from the antenna 12 and is used to develop a Doppler shift signal at the receiver 31.

The Doppler shift refers to the phenomenon which results when an object such as a missile 40 (FIGURE 8) moves relative to a target such as the target 10.

Figure 8:
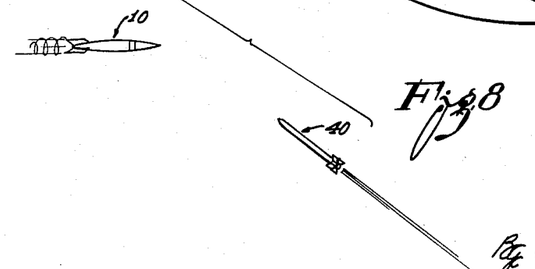
FIGURE 8 illustrates the position of a missile relative to a target at any instant of time.

Because of this approach, a periodic signal at a particular frequency from the target is provided with a shift in frequency when it is reflected from the missile and received at the target. This frequency shift becomes clear when one considers, for example, that each time the missile 40 approaches the target receiver 31 by ½ wave length (6 inches for the signal of 1970 megacycles per second), one additional cycle of radiation is received at the receiver 31 because of the shortened time required for the energy to travel this additional ½ wave length from the target to the missile and back to the target. The shift in frequency is indicated by the equation $$f_\mathrm{d} = \frac{2V_\mathrm{r}}{\lambda}$$

where $f_\mathrm{d}$ is the shift in the Doppler frequency between the transmitted and received signals, $V_\mathrm{r}$ is the velocity component of the missile 40 relative to the target 10 in the direction of movement of the missile toward the target, and $\lambda$ is the wave length of the transmitted signal. The receiver 31 heterodynes the echo frequency, which is the received frequency, against the transmitted signal and the resultant modulation or beat note is the Doppler frequency. This frequency may be between 500 cycles per second and 30 kilocycles per second at the output of the receiver 31 when the transmitted signal has a frequency of approximately 1970 megacycles per second.

Figures 3, 5:
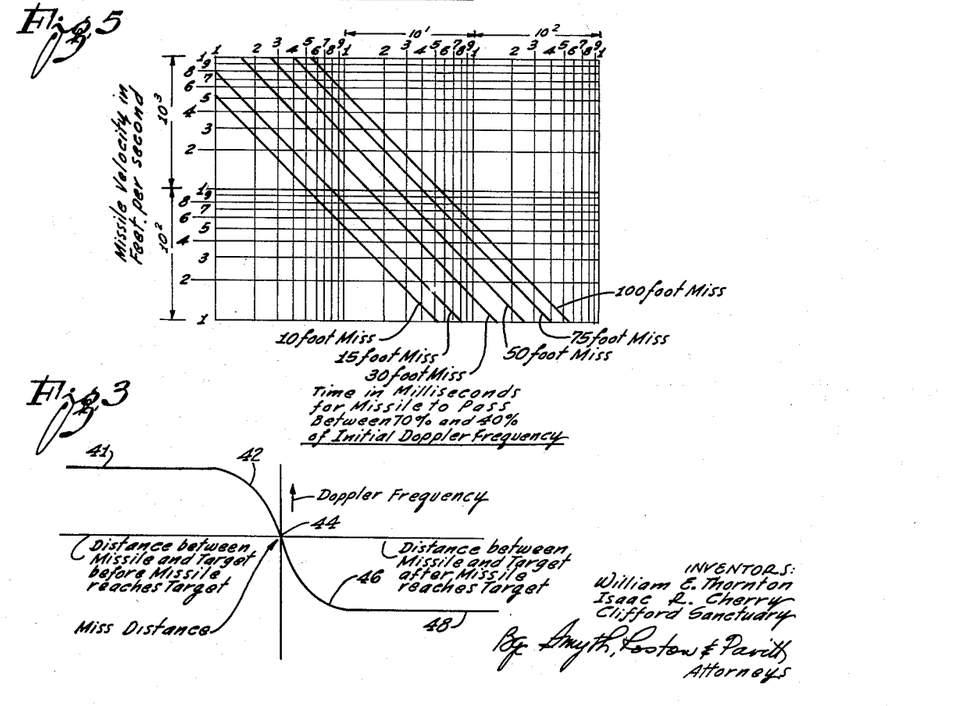
FIGURE 3 is a curve illustrating the Doppler frequencies produced between the missile and the target at progressive positions of the missile relative to the target when signals are transmitted from the target to the missile and are reflected from the missile to the target.
FIGURE 5 shows a family of curves which illustrate the relationship between the missile velocity and the time for the missile to travel through a particular distance when the missile has different miss distances relative to the target.

During the time that the missile 40 is a considerable distance from the target 10, the Doppler frequenccy is relatively constant as indicated at 41 in FIGURE 3. This results from the fact that the rate of change in distance (slant range) is a function of the cosine of the angle between the line of flight of the missile and the line between the target and missile. Therefore, the rate of change in slant range is relatively constant and maximum at large distances and falls off to zero as the missile passes the target.

As the missile approaches relatively close to the target, the Doppler frequency starts to decrease, as indicated at 42 in FIGURE 3. The Doppler frequency actually decreases progressively to a value of zero as indicated at 44 in FIGURE 3. The position 44 corresponds to the minimum distance between the missile 40 and the target 10 and represents the miss-distance.

During the time that the missile 40 is approaching the target, the signals received by the target 10 from the missile are greater in frequency than the signals transmitted from the target toward the missiles. As the missile moves away from the target past the position 44, the frequency of the signals reflected from the missile 40 becomes less than the frequency of the signals transmitted from the target 10. This results from the fact that successive ones of the transmitted signals have to travel through progressively increased distances to reach the missile 40 and have to travel through these progressively increased distances to return to the target 10 after being reflected from the missile 40. Because of this, the Doppler frequency may be considered to be negative upon a movement of the missile 40 past the miss-distance 44. The Doppler frequency progressively increases in magnitude as indicated at 46 upon the movement of the missile 40 past the target 10. When the missile has traveled a considerable distance past the target, the Doppler frequency becomes relatively constant as indicated at 48.

This invention uses the changes in the Doppler frequency to determine the miss-distance 44 between the missile 40 and the target 10. The system operates to determine the miss distance 44 by initially providing an indication representing the Doppler frequency at the position 41 of the missile relatively distant from the target. This indication is converted to a voltage having a magnitude related to the Doppler frequency and is stored for subsequent usage. As will be appreciated, this voltage also represents the velocity of the missile 40 towards the target 10 since the voltage is produced as a result of the movements of the missile toward the target.

The stored voltage representing the initial Doppler frequency is then compared at each successive instant with the voltages subsequently produced to represent the Doppler frequency as the missile approaches the target. When a first particular ratio is obtained in the comparison between the stored voltage and the variable voltage representing the Doppler frequency at each instant, a gate is opened. The gate remains open until a second particular ratio is obtained between the stored voltage and the voltage representing the Doppler frequency at each instant. By way of illustration, the first particular ratio may represent 70% of the initial Doppler frequency and the second particular ratio may represent 40% of the initial Doppler frequency.

Upon the occurrence of the second particular ratio, the gate becomes closed. During the time that the gate is open between the first particular ratio and the second particular ratio, the stored voltage representing the initial Doppler frequency is integrated with respect to time to produce a sawtooth voltage. The resultant value of this sawtooth voltage at the time of closure of the gate indicates the miss distance 44 between the missile 40 and the target 10.

Figure 4:
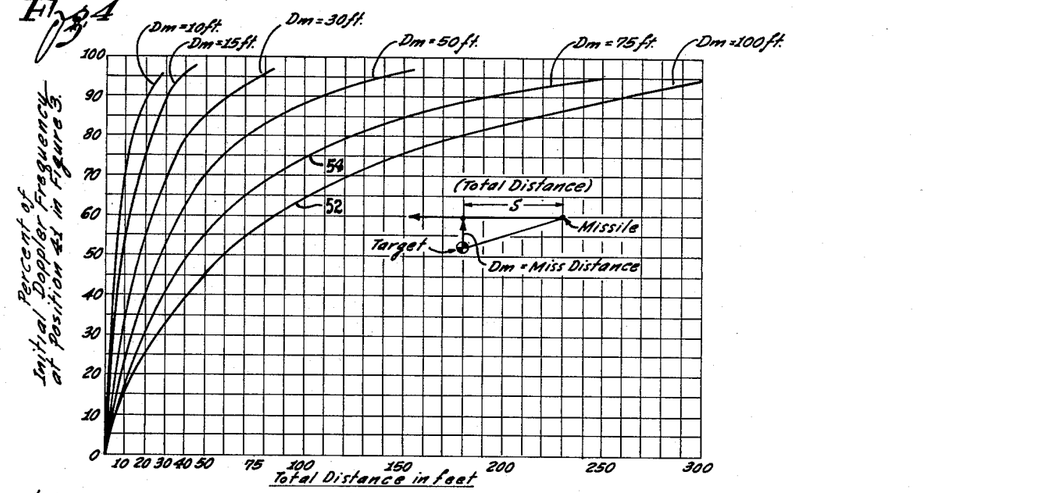
FIGURE 4 shows a family of curves which illustrate the relationship between the Doppler frequency and the distance from the missile to the target when the miss distance between the missile and the target has different values.

FIGURE 4 represents a plot of various curves, each individual to a different miss distance 44 between the missile 40 and the target 10. For example, curve 52 constitutes a plot of various values when the miss distance 44 is 100 feet. Similarly, curve 54 represents a plot of different values when the miss distance is 75 feet. The abscissa or horizontal direction in FIGURE 4 represents the distance S (FIGURE 4) between the missile 40 and the point at which it is closest to the target 10. The ordinate or vertical direction in FIGURE 4 represents the Doppler frequency at each distance in comparison to the initial Doppler frequency representing the velocity of the missile at the position 41 in FIGURE 3.

As previously described, the system constituting this invention opens a gate at a first value along the ordinate such as at a position corresponding to 70% of the initial Doppler frequency. The system constituting this invention then holds the gate open until the occurrence of a second value along the ordinate such as at a position corresponding to 40% of the initial Doppler frequency.

An examination of the curves shown in FIGURE 4 will indicate that the distance "S" traveled by the missile between the first value of 70% of the initial Doppler frequency and the second value of 40% of the initial Doppler frequency depends upon the miss distance 44 between the missile 40 and the target 10. For example, the missile travels through a distance of approximately 97−43=54 feet when the miss distance 44 between the missile and the target is 100 feet. In contrast, the missile travels only through a distance of 50−22=28 feet when the miss distance between the missile and the target is 50 feet.

FIGURE 5 indicates a number of curves which are obtained by extrapolation from FIGURE 4. The abscissa or horizontal direction in FIGURE 5 represents the time in milliseconds for the missile to travel between the first value of 70% of the initial Doppler frequency and the second value of 40% of the initial Doppler frequency. The ordinate or vertical direction in FIGURE 5 represents the missile velocities in feet per second. Each of the individual curves in FIGURE 5 represents a different miss distance 44 between the missile 40 and the target 10.

As will be seen from FIGURE 5, the miss distance is dependent upon the product of the relative missile-to-target velocity and the time during which the gate is opened. As previously described, the gate becomes opened when the value of the Doppler frequency is 70% of the initial value and the gate subsequently becomes closed when the value of the Doppler frequency decreases to 40% of the initial value. By way of illustration, the miss distance is 10 feet when the gate becomes opened for 10 milliseconds and when the missile is traveling at a velocity of approximately 540 feet per second. The miss distance becomes tripled to 30 feet when the gate is opened for the same period of 10 milliseconds and when the velocity of the missile becomes tripled to approximately 1,620 feet per second. As a further example, the miss distance becomes tripled from 10 feet to 30 feet when the missile has a velocity of 540 feet per second and the gate becomes opened for a period of approximately 30 milliseconds, which is triple the previous period of 10 milliseconds.

FIGURE 2 illustrates in block form equipment for indicating the miss distance in a manner similar to that described above. The equipment includes the transmitter 30 which introduces signals at a suitable frequency such as 1,970 megacycles per second to the antenna 12 for the transmission of such signals from the target 10 to the missile 40. A frequency of 1,970 megacycles per second is desirable since this provides a wave length of 6 inches. The signals transmitted to the missile 40 are reflected by the missile and are received by the antenna 29 and introduced to the receiver 31 at the target 10. The signals received by the receiver 31 have a frequency greater than the transmitted signal during the time that the missile 40 is approaching the target 10.

The antenna 29 also receives a portion of the signals transmitted by the antenna 12 from the target and introduces such signals to the receiver 31. The received and transmitted signals are detected by suitable stages in the receiver 31 so that only the beat signals at the Doppler frequency remain. These beat signals at the Doppler frequency are amplified and introduced to a bandpass filter 32. The filter 32 is constructed to pass signals having a range only between approximately 500 cycles per second and 30 kilocycles per second. In this way, the bandpass filter 32 passes only the Doppler frequency signals produced between the missile 40 and the target and eliminates noise signals and Doppler frequency signals produced between the target 10 and the geographical ground.

The signals from the bandpass filter 32 are introduced to a limiter circuit 33 which may be a Schmidt type. The limiter circuit 33 operates to convert the signals from the bandpass filter 32 into square waves of similar frequency and to limit the amplitudes of such square waves. The square wave signals from the limiter circuit 33 are then introduced to a detecting circuit 34 which operates to produce at each instant a direct voltage having a magnitude proportional to the frequency of the square wave signals. The magnitude of this voltage represents the initial Doppler frequency at the position 41 distinct from the target 10, as indicated in FIGURE 3. As previously described, the initial Doppler frequency also represents the missile velocity relative to the target.

The voltage initially produced in the circuit 34 to represent the missile velocity is introduced to a storage circuit 35 for storage. The voltage produced in the circuit 34 at each instant is also introduced to a coincidence circuit 50, as is the voltage from the storage circuit 35. These two voltages are compared by the coincidence circuit 50 to obtain a first pulse when the voltage from the circuit 34 has a magnitude 70% as great as the magnitude of the voltage stored in the circuit 35 to represent the initial Doppler frequency. The coincidence circuit produces a second signal when the magnitude of the voltage from the circuit 34 is only 40% as great as the magnitude of the voltage stored in the circuit 35.

The first and second signals produced in the coincidence circuit 50 are introduced to a time gate 53. The first signal triggers the time gate 53 so as to open the gate.

The gate then remains open until the introduction of the second signal from the coincidence circuit 50. The time gate becomes closed upon the introduction of the second signal from the concidence circuit 50.

During the time that the time gate 53 is opened, a time velocity multiplier circuit 55 is activated. Upon becoming activated, the time velocity multiplier 55 operates to generate a sawtooth voltage with a slope dependent upon the magnitude of the voltage stored in the circuit 35. The sawtooth voltage is generated only during the time that the time gate 53 is opened. In this way, the multiplier 55 produces a voltage which represents a multiple of the missile velocity and the period of time in which the time gate 53 is open.

Visual indications may also be provided to indicate to ground observers how closely the missile has approached to the target 10 as represented by the miss distance 44. These visual indications are obtained from the operation of miss output circuits 36, 37 and 38. The miss output circuit 36 is prepared for operation upon the introduction of signals from the limiter circuit 33. The miss output circuit actually becomes operated at the time that the multiplier 55 becomes activated. When the output circuit 36 becomes operated, it causes a first smoke signal to be produced.

If only a first smoke signal is produced, an indication is provided to the ground observers that the missile has approached within a relatively close distance such as approximately 15 feet to the target 10. If the miss distance 44 between the missile and the target is actually in the range of 15 feet to 30 feet, the magnitude of the voltage produced by the multiplier 55 becomes sufficiently great for the output circuit 37 to be operated. Upon the operation of the output circuit 37, a second smoke signal is produced. This indicates to the ground observer that the missile has missed the target in an intermediate range such as 15 to 30 feet.

The output circuit 38 becomes operated when the multiplier 55 produces a voltage having a relatively large magnitude to indicate that the miss distance is greater than 30 feet. This causes a third smoke signal to be produced. The third smoke signal indicates to a ground observer that the missile 40 has missed the target by a distance greater than 30 feet.

Figure 6:
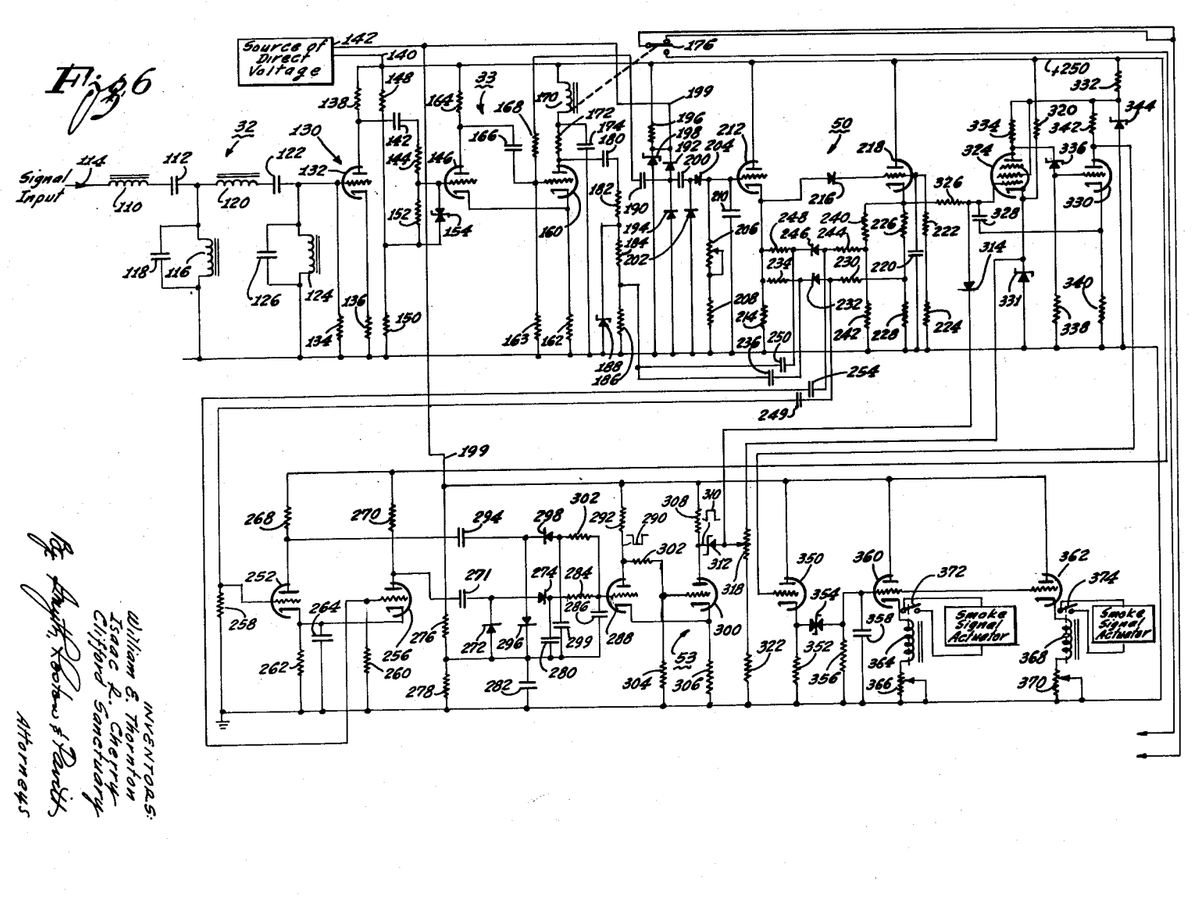
FIGURE 6 is a circuit diagram illustrating in detail the construction of the system shown in block form in FIGURE 2.
Figure 7:
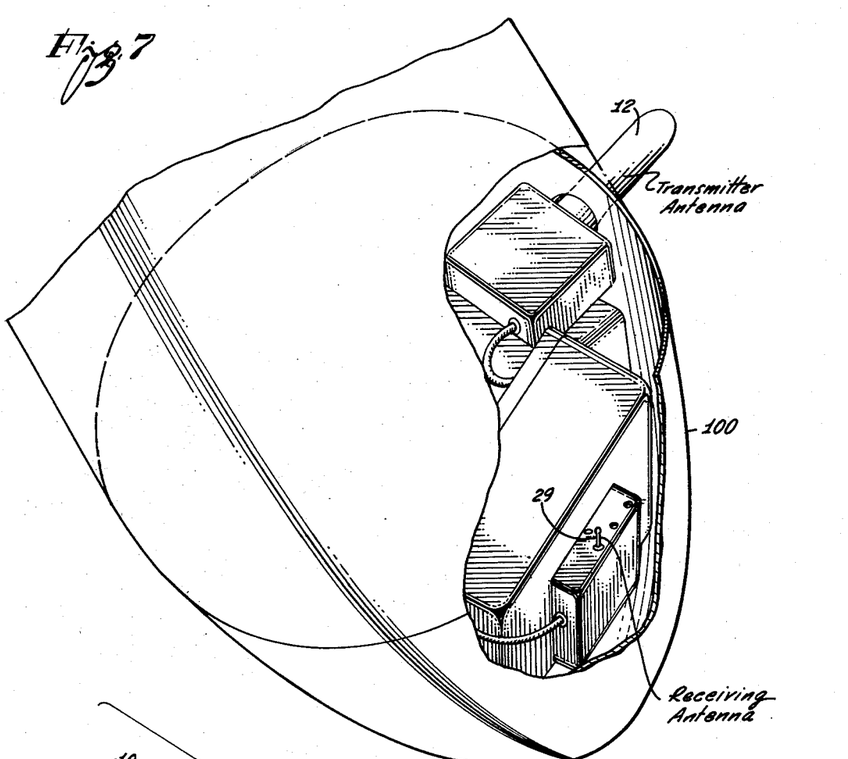
FIGURE 7 is a perspective view, partially broken away, of the casing housing the system shown in FIGURES 2 and 6 and of certain elements included in the system and particularly the transmitter and receiver antennas.

FIGURE 6 illustrates in detail the electrical features constituting one embodiment of the invention. FIGURE 7 illustrates the relative disposition of various components including the transmitter 30 and the receiver 31 in the target and including the transmitting antenna 12 and the receiving antenna 29. As will be seen from FIGURE 7, the transmitting antenna 12 is relatively large and projects through a casing 100 holding the equipment illustrated in FIGURES 6 and 7. The receiving antenna 29 is disposed within the casing 100 and is provided with a relatively short length in comparison to the length of the transmitting antenna 12 such as a length in the order of ½ inch. The receiving antenna 29 receives a portion of the signals transmitted by the antenna 12. These signals constitute a combination of the signals at the constant frequency of 1970 megacycles per second and the signals reflected from the target at a frequency slightly different from the constant frequency of 1970 megacycles per second. This slight difference constitutes the Doppler frequency.

The transmitter 30 may be a cavity oscillator of the grounded grid type. For example, the cavity resonator may use a type 6442 tube having its grid grounded. Since the cavity resonator is fairly conventional, it will not be described in detail in this application. The receiver may also be conventional and may include a crystal detector to eliminate microphonic noise from the transmitter and an audio detector having a broad band to pass signals in the range of 500 cycles to 30 kilocycles. The signals from the audio detector may then be amplified to give a gain of approximately 1,000.

The signals from the audio amplifiers are then introduced to the bandpass filter 32 shown in detail in FIGURE 6. The bandpass filter 32 includes an inductance 110 and a capacitance 112 in series with an input line 114 from the audio amplifiers. An inductance 116 and a capacitor 118 are connected in parallel from the capacitor 112 to ground. The inductances 110 and 116 may respectively have values of 30 millihenries and 0.7 henry. The capacitors 112 and 118 may respectively have values of 0.05 microfarad and 2,700 micro-microfarads.

The inductance 110 and the capacitance 112 provide a series resonant circuit at the high end of the pass band so as to pass signals only to a range of approximately 30 kilocycles. The inductance 116 and the capacitance 118 provide a low impedance to ground at the low end of the bandpass. This prevents the signals of low frequency such as those below approximately 500 cycles per second from passing to the next stage. In this way the series circuit formed by the inductance 110 and the capacitance 112 and the parallel circuit formed by the inductance 116 and the capacitance 118 cooperate to pass signals only in the range between approximately 500 cycles per second and 30 kilocycles per second.

The signals having frequencies between 500 cycles per second and 30 kilocycles per second are introduced to a second stage in the bandpass filter 32 similar to that described above. This second stage in the bandpass filter 32 includes an inductance 120 and a capacitance 122 in series and further includes an inductance 124 and a capacitor 126 in parallel. The values of the elements 120, 122, 124 and 126 respectively, correspond to the values of similar elements in the previous stage of the bandpass filter. In this way, the elements 120, 122, 124 and 126 cooperate to provide a further filtering action on the signals so that only signals in the range between 500 cycles per second and 30 kilocycles per second are able to pass to the next stage. This next stage constitutes an amplifier generally indicated at 130.

The amplifier 130 includes a tube 132 which may be a type 12AT7. A resistance 134 having a value of approximately 4.7 kilo-ohms extends electrically from the grid of the tube 132 to ground so as to bias the grid for a flow of current through the tube 132. The grid of the tube 132 also receives the signals passing through the bandpass filter 32.

The cathode of the tube 132 is connected to one terminal of a resistor 136 having its second terminal grounded. The resistor 136 may be provided with a value in the order of 220 ohms. The plate of the tube 132 has a positive voltage applied to it through a resistor 138 from a line 140, which is connected to receive a positive potential in the order of +250 volts from a source 142 of direct voltage. The resistor 138 may have a value in the order of 33 kilo-ohms.

The alternating signals introduced to the grid of the tube 132 are amplified and inverted in the amplifier 130 and are introduced to the grid of a tube 146 through a capacitor 142 and a resistor 144 in series. The tube 146 is included in the limiter circuit 33. The grid of the tube 146 is biased by a pair of resistors 148 and 150, which are connected in series between the line 140 and ground. A resistor 152 is connected between the resistors 144 and 150 and a pair of Zener diodes 154 are connected in back-to-back relationship across the resistor 152. The resistors 144, 148, 150 and 152 may respectively have values of 27 kilo-ohms, 470 kilo-ohms, 82 kilo-ohms and 220 kilo-ohms. The capacitor 142 may have a value in the order of 0.047 microfarad and the Zener diodes 154 may be a type 1N226.

The cathode of the tube 146 and the cathode of a tube 160 are connected to one terminal of a resistance 162 having a value in the order of 68 kilo-ohms. The second terminal of the resistance 162 is grounded. The plate of the tube 146 is connected to one terminal of a resistance 164, the second terminal of which is connected to the line 140 from the voltage source 142. The resistance 164 may have a value in the order of 47 kilo-ohms. A capacitor 166 and a resistor 168 couples the plates of the tube 146 to the grid of the tube 160. The capacitor 166 may have a value in the order of 22 microfarads and the resistor 168 may have a value in the order of one megohm.

The alternating signals from the plate of the tube 132 are introduced through the coupling capacitor 142 to the grid of the tube 146. The tube 146 is biased by the resistors 148 and 150 to become conductive only upon the introduction of alternating signals of a particular amplitude from the plate of the tube 130. The amplitude of the signals required to obtain a conduction of the tube 146 is precisely controlled because of the connection of the Zener diodes in a back-to-back relationship across the resistance 152.

When the tube 146 becomes conductive, alternating signals having a frequency corresponding to the frequency of the signals passing through the bandpass filter 32 are produced on the plate of the tube. These signals have a frequency representing the initial Doppler frequency at a position 41 of the missile 40 distant from the target 10. The signals initially produced on the plate of the tube 146 also have a frequency representing the velocity of the missile relative to the target.

The alternating signals produced on the plate of the tube 146 are introduced through the coupling capacitance 166 to the grid of the tube 160. The grid of the tube 160 is biased by grounded resistor 163 having a value in the order of 220 kilo-ohms. When the signal introduced from the plate of the tube 146 to the grid of the tube 160 is positive, relatively little current is flowing through the tube 146 so that a relatively low voltage is produced across the resistor 162 and on the cathode of the tube 160. The positive voltage on the grid of the tube 160 and the low voltage on the cathode of the tube cause the tube to be positively biased so that a relatively large current flows through the tube. This current produces across the resistor 162 a positive voltage which biases the tube so that the current tends to decrease. In this way, the common cathode resistor 162 provided for the tubes 146 and 160 tends to limit the current through the tube 160 and to limit the amplitude of the alternating signal produced on the plate of the tube.

A relay 170 and a resistor 172 are in series between the line 140 and the plate of the tube 160. The resistor 172 has a suitable value such as approximately 22 kilo-ohms. A capacitor 174 having a suitable value such as 0.1 microfarad extends electrically from ground to the common terminal between the resistor 172 and the relay 170.

The relay 170 is provided with characteristics to actuate the movable arm of a switch 176 from its upper stationary contact to its lower stationary contact in FIGURE 6. When the movable arm of the switch 176 becomes actuated into engagement with the lower stationary contact in FIGURE 6, a circuit is completed for firing a first smoke puff. This smoke puff indicates that the missile is approaching the target. As previously described, if no other smoke puffs are subsequently produced, a visual indication is provided to ground observers that the missile 40 has missed the target 10 by at least a particular distance such as less than 15 feet.

The signals produced on the plate of the tube 160 are introduced to a differentiating network formed by a capacitor 180 and resistors 182, 184 and 186 in series. The capacitor 180 has a suitable value in the order of 0.01 microfarad and the resistors 182, 184 and 186 respectively, have values in the order of 470 kilo-ohms, 10 kilo-ohms and 2.7 kilo-ohms. A Zener diode 188 such as a type 1N465 is connected between ground and the terminal common to the resistors 182 and 184.

The differentiator formed by the elements 180, 182, 184 and 186 operates to differentiate the square wave signals produced on the plate of the tube 160 so as to produce sharp control signals. These control signals vary from a direct voltage having a regulated value at the terminal common to the resistors 184 and 186, the regulated direct voltage being produced as a result of the operation of the Zener diode 188.

The alternating signals produced on the plate of the tube 146 are introduced through condenser 166, a resistor 168 and a coupling capacitor 190 to the plate of a diode 192 and the cathode of a diode 194. The coupling capacitor 190 may have a suitable value in the order of 0.01 microfarad and the diodes 192 and 194 may be types 1N463. The voltage on the cathode of the diode 192 is regulated at a suitable direct voltage such as +150 volts. This regulation is provided by a series circuit including a resistor 196 and a Zener diode 198 extending electrically from a line 140 to ground, the line 140 being connected to the source 142 of direct voltage. The cathode of the diode 192 is connected to the terminal common to the resistor 196 and the Zener diode 198. The plate of the diode 194 is grounded.

When the alternating signal passing through the coupling capacitor 190 has an amplitude in excess of +150 volts, the diode 192 becomes conductive so that the voltage on the plate of the diode becomes limited to +150 volts. In like manner, the diode 194 becomes conductive in the negative half cycles of the alternating signals so that the voltage on the cathode of the diode 194 is limited in the negative direction to 0 volt.

Because of the operation of the elements 192, 194, 196 and 198, a signal variable between 0 volt and +150 volts is introduced through a capacitor 200 to the cathode of a diode 202 and the plate of a diode 204. The signal passes through the coupling capacitor 200 only in the positive half cycles of the alternating voltage. The capacitor 200 may have a suitable value in the order of 22 micro-microfarads and the diodes 202 and 204 may be types 1N463. The diode 202 further operates to limit the signal in negative swings so that the signal cannot become negative.

The positive signal passing through the diode 204 is introduced to a rheostat 206 and a resistor 208 connected in series between the cathode of the diode and ground. The rheostat 206 and the resistor 208 may respectively have values in the order of 500 kilo-ohms and 330 kilo-ohms. The rheostat 206 is adjusted to calibrate the computer shown in FIGURE 6 so that the computer will provide an output voltage directly indicating the miss distance 44 between the missile 30 and the target 10.

The capacitor 200, the rheostat 206 and the resistor 208 provide an RC circuit in which the reactance of the capacitor 200 is much greater than the resistive values of the rheostat 206 and the resistor 208. Because of this, the voltage produced across the rheostat 206 and the resistor 208 is largely dependent upon the reactance of the capacitor 200. This causes the voltage produced across the rheostat 206 and the resistor 208 to increase progressively with the increases in frequency. The peak voltage produced across the rheostat 206 and the resistor 208 is accordingly indicative of the Doppler frequency at each instant.

The voltage produced across the rehostat 206 and the capacitor 208 causes a capacitor 210 to be charged since the capacitor is connected across the rheostat 206 and the resistor 208. The capacitor 210 may be provided with a suitable value in the order of 2200 micro-microfarads. The capacitor 210 is charged to the peak value of the voltage produced across the rehostat 206 and the resistor 208. This peak voltage biases the grid of a tube 212 which is included with a resistor 214 in a cathode follower stage. The resistor 214 may be provided with a value in the order of 22 kilo-ohms and one terminal of the resistor 214 is grounded. The plate of the tube 212 is connected to the line 140 for receiving a positive potential such as in the order of +250 volts. Since the tube 212 and the resistor 214 constitute a cathode follower, the voltage on the cathode of the tube 212 follows the direct potential produced across the capacitor 210 at each instant. The tube 212 may be type 12AX7.

The plate of a diode 216 is connected to the cathode of the tube 212 and the cathode of the diode 216 is connected to the grid of a tube 218 which is included in a cathode follower stage. A capacitor 220 having a value in the order of 0.1 microfarad extends electrically between the grid of the tube 218 and ground. The capacitor 220 is charged to a potential corresponding to the peak potential produced across the resistor 214. In this way, the diode 216 becomes conductive to pass the potential from the cathode of the tube 212 to the grid of the tube 218 only when the peak potential produced on the cathode of the tube 212 exceeds the voltage produced across the capacitor 220 by the charging of the capacitor.

The voltage produced across the capacitor 220 is stored in the capacitor between successive periods of charge without any dilution in the charge. This results from the fact that a pair of resistors 222 and 224 having relatively large values are connected across the capacitor. For example, the resistors 222 and 224 may respectively have values of 22 meg-ohms such that the RC time constant of the circuit produced by the capacitor 220 and the resistors 222 and 224 is quite long. By charging the capacitor 220 to the peak value of the voltage produced across the resistor 214 and by retaining this charge in the capacitor, the capacitor provides an indication of the Doppler frequency at the position 41 remote from the target 10.

A pair of resistors 226 and 228 are in series between the cathode of the tube 218 and ground. Each of the resistors 226 and 228 may have a value in the order of 22 kilo-ohms. A resistor 230 having a value in the order of 47 kilo-ohms is connected at one end to the terminal common to the risistors 226 and 228 and at the other end to the plate of a diode 232, which may be a type 1N463. A resistor 234 having a value in the order of 470 kilo-ohms is disposed electrically between the cathode of the diode 232 and the cathode of the tube 212. The cathode of the diode 232 also receives the differentiated signals produced on the terminal common to the resistors 184 and 186. This results from the connection of a coupling capacitor 236 between the cathode of the diode 232 and the terminal common to the resistors 184 and 186. The coupling capacitor 236 may have a value in the order of 0.01 microfarad.

The resistors 226, 228, 230, 234 and 214 provide a voltage-dividing network to determine the ratio at each instant between the voltage stored in the capacitor 220 to represent the initial Doppler frequency and the voltage produced on the cathode of the diode 232 at each instant to represent the instantaneous Doppler frequency at that instant. During the time that the voltage representing the instantaneous Doppler frequency is greater than 70% of the voltage stored in the capacitor 220 to represent the initial Ooppler frenquency, the diode 232 cannot become conductive. The diode 232 becomes conductive, however, at the instant that the voltage representing the Doppler frequency at each instant has a value of 70% of the voltage stored in the capacitor 220 to represent the initial Doppler frequency. When the diode 232 becomes conductive, alternating signals pass through a circuit including the resistor 228, the resistor 230, the diode 232, the capacitor 236 and the resistor 186. The passage of these alternating signals is facilitated by the production of the differentiated signal across the resistor 186.

In like manner, a pair of resistors 240 and 242 are in series between the cathode of the tube 218 and ground. The resistors 240 and 242 may respectively have values in the order of 12 and 33 kilo-ohms. A resistor 244 having a value in the order of 47 kilo-ohms extends electrically between the terminal common to the resistors 240 and 242 and the plate of a diode 246, which may be a type 1N463. A resistor 248 having a value in the order of 470 kilo-ohms is connected between the cathode of the diode 246 and the cathode of the tube 210. A capacitor 250 having a value in the order of 0.01 microfarad couples the cathode of the diode 246 to the terminal common to the resistors 184 and 186 for the passage of alternating signals.

The values of the resistors 240, 242, 244, 248 and 214 are chosen so that the diode 246 becomes conductive when the voltage representing the Doppler frequency at each instant has a value corresponding to 40% of the voltage stored in the capacitor 220 to represent the initial Doppler frequency. When the diode 246 becomes conductive, an alternating current flows through a circuit including the resistor 242, the resistor 244, the diode 246, the capacitor 249 and the resistor 186. The flow of this alternating current is facilitated by the introduction to the cathode of the diode 246 of the differentiated signals which are produced across the resistor 186.

The alternating signals produced on the plate of the diode 232 are introduced through a coupling capacitor 249 to the grid of a tube 252 which may be a type 12AX7. The production of alternating signals on the plate of the diode 232 is desirable since the coincidence circuit 50 including the tubes 212 and 218 responds to direct voltages which are produced on the cathodes of the tube 212 and 218. In this way, the coincidence circuit 50 compares direct voltages and produces at its output terminal an alternating voltage which can be easily distinguished from the direct voltages compared in the circuit. An alternating voltage is also produced on the plate of the diode 246 and introduced through a capacitor 254 to the grid of a tube 256, which may also be a type 12AX7. The coupling capacitors 249 and 254 may have values in the order of 0.001 microfarad.

The grids of the tubes 252 and 256 are respectively biased by resistors 258 and 260 which extend electrically from the grids of the tubes to ground. A parallel circuit formed by a resistor 262 and a capacitor 264 is disposed electrically between the cathodes of the tubes 252 and 256 on ground. The plates of the tubes 252 and 256 respectively receive positive potentials through resistors 268 and 270 from the line 140. The capacitor 264 may have a value in the order of 10 microfarads and the resistors 258, 260, 262 may have values in the order of 470 kilo-ohms. The resistors 268 and 270 may be provided with values in theorder of 100 kilo-ohms.

The tube 256 is included in an A.C. amplifier such that alternating signals are produced on the plate of the tube. The alternating signals produced on the plate of the tube 256 pass through a coupling capacitor 271 to the cathode of a diode 272 and to the plate of a diode 274. The capacitor 271 may have a value in the order of 0.01 microfarad and the diodes 272 and 274 may be types 1N270. The plate of the diode 272 is connected to the terminal common to a pair of resistors 276 and 278 which extend electrically between the line 199 and ground. The resistors 276 and 278 may respectively have values in the order of 220 kilo-ohms and 9.1 kilo-ohms.

A capacitor 282 having a value in the order of 0.1 microfarad is connected between the plate of the diode 272 and ground. A capacitor 280 having a value in the order of 0.001 microfarad is disposed electrically between the cathode of the diode 274 and the plate of the diode 272. A resistor 284 having a value in the order of 2.2 megohms is connected between the cathode of the diode 274 and the grid of a tube 288, in the time gate 53. A capacitor 286 extends electrically from the grid of the tube 288 to the plate of the diode 272. The capacitor 286 may have a value in the order of 0.01 microfarad.

The positive signals produced on the plate of the tube 256 pass through the coupling capacitor 270 and the diode 274 to the capacitor 280 and charge the capacitor. The capacitor 280, the resistor 284 and the capacitor 286 constitute a filter for converting the alternating signals on the plate of the tube 256 to a corresponding direct voltage of a positive polarity. This direct voltage biases the grid of the tube 288 to produce a state of conductivity in the tube.

When current flows through the tube 288, a negative signal is produced on the plate of the tube, as indicated at 290 in FIGURE 6. The negative signal 290 is produced on the plate of the tube because of the voltage drop across a resistance 292 which is connected between the plate of the tube and the line 199 extending from the voltage source 142. The resistor 292 may be provided with a suitable value in the order of 100 kilo-ohms.

The alternating signals produced on the plate of the tube 252 pass through a coupling capacitor 294 to the plate of a diode 296 and the cathode of a diode 298. The capacitor 294 may have a value in the order of 0.01 microfarad and the diodes 296 and 298 may be types 1N270. A capacitor 299 having a value in the order of 0.001 microfarad is connected between the plate of the diode 298 and the cathode of the diode 296, the cathode of the diode 296 also being connected to the plate of the diode 272. A resistor 302 having a value in the order of 2.2 megohms is connected between the plate of the diode 298 and the grid of the tube 288.

Because of the electrical connection of the diode 298 in the circuit, only the negative signals produced on the plate of the tube 252 are able to pass through the coupling capacitor 294 and the diode 298 to the capacitor 299 so as to charge the capacitor. The capacitor 299, the resistor 302 and the capacitor 286 constitute a filter such that a direct voltage is produced across the capacitor 286 as a result of the alternating signals produced on the plate of the tube 252. The direct voltage produced across the capacitor 286 as a result of the alternating signals on the plate of the tube 252 has a negative polarity. This causes the tube 288 to become cut off such that the voltage on the plate of the tube returns to a high value.

As will be seen from the above discussion, the tube 288 becomes conductive at the time that the Doppler frequency has a value corresponding to 70% of the initial Doppler frequency. When the tube 288 becomes conductive, it produces the pulse 290. The tube 288 continues to produce the pulse 290 until the Doppler frequency has a value corresponding to 40% of the initial Doppler frequency. At that time, the tube 288 becomes non-conductive so as to interrupt the pulse 290. The tube 288 accordingly operates to provide a time gate as represented by the pulse 290.

The tube 288 is included in the time gate 53 with a tube 300. The tubes 288 and 300 in effect constitute a multivibrator because of the connections between the tubes. For example, a resistance 302 having a value in the order of 2.2 megohms is connected between the plate of the tube 288 and the grid of the tube 300. The grid of the tube 300 is biased to a state of conductivity by a resistance 304 which is in series with the resistances 292 and 302 between the line 199 and ground. The resistance 304 may be provided with a value in the order of 150 kilo-ohms. A resistance 306 having a value in the order of 10 kilo-ohms is connected between the cathodes of the tubes 288 and 300 and ground. A resistance 308 having a value in the order of 47 kilo-ohms is disposed electrically between the plate of the tube 300 and the line 199.

The tube 300 is ordinarily conductive because of the positive bias produced on the grid of the tube by the voltage dividing network formed by the resistors 292, 302 and 304. Upon the introduction of the pulse 290 from the plate of the tube 288 to the grid of the tube 300, the tube 300 becomes cut off so as to produce a positive pulse 310 on the plate of the tube. This pulse is actually used to gate the output stages for the production of an output voltage.

The pulse 310 on the plate of the tube 300 is introduced through a Zener diode 312 to the cathode of a diode 314. The Zener diode 312 may be a type 1N736 and the diode 314 may be a type 1N457. The Zener diode 312 is included to shift the direct voltage downwardly without losing any of the amplitude in the pulse 310. This is accomplished by connecting the plate of the Zener diode 312 to the movable arm of a potentiometer 318. The potentiometer 318 is in series with a pair of resistances 320 and 322 between the line 140 and ground. The potentiometer 318, the resistance 320 and the resistance 322 may respectively have values in the order of 5.0 kilo-ohms, 82 kilo-ohms and 2.2 kilo-ohms.

The plate of the diode 314 is connected to the grid of a pentode 324, which may be a type 6U8. A resistance 326 having a value in the order of 10 megohms is also connected at one terminal to the grid of the pentode 324 and at the other terminal to the cathode of the tube 218. A capacitor 328 having a value in the order of 750 micro-microfarads is disposed electrically between the grid of the tube 324 and the cathode of a tube 330.

The cathode and screen grid of the pentode 324 have a common terminal with the resistor 320 and the potentiometer 318. A Zener diode 331 extends electrically between the cathode of the pentode 324 and ground. The Zener diode 331 may be a type 1N714. A resistor 332 is in series with a resistor 334 between the line 140 and the plate of the pentode 324. The resistors 332 and 334 may respectively have values in the order of 33 kilo-ohms and 100 kilo-ohms.

The plate of the tube 324 is connected through a Zener diode 336 to the grid of the tube 330. The grid of the tube 330 is biased by a resistor 338 which is connected between the grid of the tube and ground. A resistor 340 extends electrically between the cathode of the tube 330 and ground. A resistor 342 is in series with the resistor 332 between the line 140 and the plate of the tube 330. A Zener diode 344 is connected at one terminal to the resistor 332 and is grounded at the other terminal. The Zener diodes 336 and 344 may be respectively types 1N736 and 1N3011B. The resistors 338, 340 and 342 may respectively have values in the order of 680 kilo-ohms, 47 kilo-ohms and 150 kilo-ohms.

As previously described, a voltage is produced across the capacitor 220 to represent the initial Doppler frequency at the position 41 distant from the target. Since this voltage is introduced to the grid of the tube 218 and since the tube 218 is included in a cathode follower stage, a voltage is produced on the cathode of the tube 218 corresponding to the voltage across the capacitor 220. In this way, a voltage is constantly introduced to the grid of the pentode 324 in representation of the initial Doppler frequency at the position 41 distant from the target. This voltage is prevented from producing a flow of current through the pentode 324 because of the relatively low voltage produced on the plate of the tube 300 as a result of the normal flow of current through the tube. The low voltage on the plate of the tube 300 passes through the diode 314 and biases the grid of the pentode 324 to prevent the pentode from conducting.

Upon the production of the positive pulse 310 on the plate of the tube 300, the bias introduced from the plate of the tube 300 to the grid of the pentode 324 to prevent conduction of the pentode is removed. This causes the pentode 324 to become conductive such that current flows through the pentode. The current flowing through the pentode 324 is dependent upon the voltage on the cathode of the tube 218. Since the voltage on the cathode of the tube 218 represents the initial Doppler frequency at the position 41 distant from the target 10, the current flowing through the pentode 324 is directly related to this initial Doppler frequency. This current flows for a period of time corresponding to the duration of the pulse 310.

When current flows through the pentode 324, it causes a negative voltage to be produced on the plate of the pentode because of the voltage drop across the resistor 334. This voltage drop on the plate of the pentode 324 is introduced to the grid of the tube 330 to reduce the current ordinarily flowing through the tube. The reduction in the current flowing through the tube 330 causes the voltage on the cathode of the tube 330 to decrease. This reduced voltage is introduced through the feedback capacitor 328 to the grid of the pentode 324 to control the flow of current through the pentode. The negative feedback voltage from the cathode of the tube 330 to the grid of the tube 324 is provided to insure the linear operation of the multiplier 55, which includes the pentode 324 and the tube 330. The capacitor 328 is also instrumental in cooperation with the resistor 326 in controlling the changes in the flow of current through the pentode 324 with changes in the initial Doppler frequency at the position 41 distant from the target 10. In this way, the resistor 326 and the capacitor 328 control the slope at which the saw-tooth voltage produced by the multiplier 55 rises during the period of production of the gating pulse 310.

The saw-tooth voltage is produced in the multiplier 55 as a result of the operation of a cathode follower stage including a tube 350. The plate of the tube 350 receives a potential of +150 volts through the line 199 from the voltage source 142. The grid of the tube 350 is connected to the plate of the tube 330. The cathode of the tube 350 is connected to one terminal of a resistor 352, the second terminal of which is grounded. The resistor 352 may have a value in the order of 33 kilo-ohms.

A pair of Zener diodes 354 and a resistor 356 are in series between the cathode of the tube 350 and ground. The Zener diodes are in a back-to-back relationship and may be types 1N233. A capacitor 358 is connected across the resistor 356. The resistor 356 may have a value in the order of 22 megohms and the capacitor 358 may have a value in the order of 0.02 microfarad.

As previously described, the current through the tube 330 decreases when the tube 324 becomes conductive. This decrease in the current through the tube 330 causes a positive voltage to be produced on the plate of the tube and to be introduced to the grid of the tube 350. Since the tube 350 is included in a cathode follower stage, the voltage on the cathode of the tube increases in accordance with the increase on the voltage in the grid of the tube. This increase in the voltage on the cathode of the tube causes the capacitor 358 to become charged.

The capacitor 358 is provided with a value such that the voltage across the capacitor rises linearly during the time that a relatively high voltage is produced on the cathode of the tube 350. The voltage across the capacitor 358 rises at a rate dependent upon the voltage produced on the cathode of the tube 218 to represent the initial Doppler frequency at the position 41 distant from the target. The voltage produced across the capacitor 358 is also dependent upon the time in which the increased potential is produced on the cathode of the tube 350. In this way, the voltage produced across the capacitor 350 represents the product of the initial Doppler frequency and the time required to change the Doppler frequency from a value corresponding to 70% of the initial Doppler frequency and a value corresponding to 40% of the initial Doppler frequency.

The voltage produced across the capacitor 358 is introduced to the grids of a pair of tubes 360 and 362. The plates of the tubes 360 and 362 receive a positive potential in the order of +150 volts through the line 199 from the voltage source 142. A relay 364 and a rheostat 366 are in series between the cathode of the tube 360 and ground. Similarly, a relay 368 and a rheostat 370 are in series between the cathode of the tube 362 and ground.

When the missile 40 approaches within a particular distance such as approximately 15 feet from the target 10, a sufficient current flows through the relay 364 to energize the relay. The energizing of the relay 364 is dependent upon the operating characteristics of the relay and upon the manual setting of the rheostat 366. Upon an energizing of the relay 364, a switch 372 becomes closed to obtain the release of a second smoke signal. This second smoke signal indicates to a ground observer that the missile has approached the target within the particular miss distance such as over 15 feet.

In like manner, the relay 368 becomes energized when the missile approaches within a second particular distance such as 30 feet of the target. The energizing of the relay 368 causes a switch 374 to become actuated so that a third smoke signal is produced. This smoke signal indicates to an observer on the ground that the missile has approached to within a second particular distance such as over 30 feet of the target.

It will be seen from the above discussion that the miss distance 44 is determined before the missile 40 reaches the target 10. This is advantageous because it prevents any shock waves produced between the missile and the target at the miss distance 44 from affecting the results obtained by the apparatus constituting this invention.

We claim:

1. In combination for determining the distance missed by a missile in moving toward a target, means for transmitting signals toward the missile and for receiving signals representing signals reflected from the missile, means responsive to the transmitted and received signals for combining these signals to produce difference signals having characteristics representing the speed of the missile relative to the target, and means responsive to the difference signals and to particular changes in the difference signals before the movement of the missile to its minimum miss distance relative to the target for combining the difference signals and the particular changes in the difference signals to produce an output indication representing the miss distance.

2. The combination set forth in claim 1 in which the transmitting and receiving means include a first antenna having a relatively great length for the transmission of the signals and further include a second antenna having a relatively short length for the reception of the signals.

3. In combination for determining the distance missed by a missile in moving toward a target, means in the target for transmitting signals at a particular frequency toward the target and for receiving signals representing signals reflected from the target, means responsive to the transmitted and received signals for comparing these signals to produce signals having a Doppler frequency representing the approach of the missile relative to the target at each instant, converting means responsive to the signals representing the Doppler frequency at each instant for producing a voltage having a magnitude related to the Doppler frequency at that instant, means responsive to the voltage initially produced by the converting means for storing this voltage to represent the speed of the missile relative to the target, gating means having an opened state of operation and a closed state of operation and responsive to the stored voltage and to the voltage produced at each instant by the converting means for comparing these voltages to obtain an opening of the gate means upon a first particular result in the comparison and to obtain a closure of the gate means upon a second particular result in the comparison, and means responsive to the open state of the gate means for obtaining an integration of the stored voltage during such open state.

4. In combination for determining the distance missed by a missile in moving toward a target, means in the target for providing signals for transmission toward a target and for receiving signals representing signals relected from the target, means in the target and responsive to the transmitted and received signals for combining these signals to represent an initial Doppler frequency and an instantaneous Doppler frequency at successive instants of time, and means in the target and responsive to the initial Doppler frequency and the instantaneous Doppler frequency at successive instants of time for combining these signals in a particular relationship to produce signals representing the miss distance before the passage of any shock waves to the target as a result of the movement of the missile past the target.

5. The combination set forth in claim 4 in which means are responsive to the signals representing the miss distance between the missile and the target to provide visual indications at a position removed from the missile and the target as to the occurrence of such miss distance within particular limits.

6. The combination set forth in claim 4 in which the transmitting and receiving means include a first antenna having a relatively great length for the transmission of the signals and further include a second antenna having a relatively short length for the reception of the signals.

7. A method of determining the distance missed by a missile in moving toward a target, including the steps of: transmitting signals toward the missile and receiving signals representing signals reflected from the missile, comparing the frequencies of the signals to obtain a Doppler frequency initially representing the velocity of the missile relative to the target, comparing the Doppler frequency produced at successive instants of time with the initial Doppler frequency to determine first and second particular ratios between the instantaneous Doppler frequency and the initial Doppler frequency, converting the initial Doppler frequency to a corresponding voltage, and integrating the voltage representing the initial Doppler frequency during a time between the production of the first and second ratios in the instantaneous Doppler frequency relative to the initial Doppler frequency.

References Cited in the file of this patent

UNITED STATES PATENTS

| | | |
|---|---|---|
| 2,866,192 | Johnson et al. | Dec. 23, 1958 |
| 2,927,793 | Del Mar | Mar. 8, 1960 |
| 2,992,422 | Hayes | July 11, 1961 |
| 3,020,548 | Jacobson et al. | Feb. 6, 1962 |
| 3,029,426 | Robinson | Apr. 10, 1962 |
| 3,034,115 | Grantham et al. | May 8, 1962 |

FOREIGN PATENTS

| | | |
|---|---|---|
| 585,791 | Great Britain | Feb. 25, 1947 |